(12) United States Patent
Su et al.

(10) Patent No.: US 9,771,494 B2
(45) Date of Patent: Sep. 26, 2017

(54) COATING, METHOD FOR MANUFACTURING THE COATING AND FILM FORMED BY THE COATING

(71) Applicant: INDUSTRIAL TECHNOLOGY RESEARCH INSTITUTE, Hsinchu (TW)

(72) Inventors: Yu-Yang Su, New Taipei (TW); Chun-Hsiang Wen, Hsinchu (TW); Kuo-Tung Huang, Hsinchu County (TW); Chyi-Ming Leu, Hsinchu County (TW); Chih-Jen Yang, Taoyuan County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1171 days.

(21) Appl. No.: 13/893,668

(22) Filed: May 14, 2013

(65) Prior Publication Data

US 2014/0147649 A1     May 29, 2014

(30) Foreign Application Priority Data

Nov. 23, 2012 (TW) .............................. 101144034 A

(51) Int. Cl.
    *C09D 183/06*     (2006.01)
    *B32B 3/26*     (2006.01)
    *C08G 77/14*     (2006.01)

(52) U.S. Cl.
CPC ............ *C09D 183/06* (2013.01); *B32B 3/266* (2013.01); *B32B 2264/102* (2013.01);
(Continued)

(58) Field of Classification Search
CPC ........ C09D 183/06; C08G 77/14; C08K 3/36; C08K 2201/011; B32B 3/266; Y10T 428/249956; Y10T 428/249986
See application file for complete search history.

(56) References Cited

U.S. PATENT DOCUMENTS 7,101,523 B2     9/2006     Mori et al.

FOREIGN PATENT DOCUMENTS

| CN | 1419587 A | 5/2003 |
| CN | 1990799 A | 7/2007 |

(Continued)

OTHER PUBLICATIONS

Haas et al. "Synthesis, properties and applications of inorganic-organic copolymers". Current Opinion in Solid State & Materials Science, 4, (1999); pp. 571-580.*
(Continued)

*Primary Examiner* — Prashant J Khatri
(74) *Attorney, Agent, or Firm* — Locke Lord LLP; Tim Tingkang Xia, Esq.

(57) ABSTRACT

A coating includes an organosiloxane polymer and a mesoporous silica material bonded with the organosiloxane polymer. A monomer of the organosiloxane polymer is

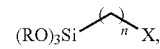

$$(RO)_3Si \frown_n X,$$

and the surface of the mesoporous silica material includes a hydrophilic group. A method for manufacturing the coating includes the following steps. Provide an organosiloxane polymer polymerized from a plurality of organosiloxanes including a terminal functional group. Provide a mesoporous silica precursor including a surface functional group. The
(Continued)

organosiloxane polymer and the mesoporous silica precursor are blended in a solution, so that the surface functional group reacts with the terminal functional group to form a bond, and a mesoporous silica material is formed, as well as the surface of the mesoporous silica material includes a hydrophilic group. A film including a thickness of 0.1-500 µm is formed by the coating.

28 Claims, 5 Drawing Sheets

(52) U.S. Cl.
CPC ........ *B32B 2307/728* (2013.01); *C08G 77/14* (2013.01); *C08K 2201/011* (2013.01); *Y10T 428/249956* (2015.04); *Y10T 428/249986* (2015.04)

(56) References Cited

FOREIGN PATENT DOCUMENTS

| CN | 101072727 A | 11/2007 | |
|---|---|---|---|
| CN | 101423634 A | 5/2009 | |
| GB | WO 2012022983 A1 * | 2/2012 | ............. G02B 1/113 |
| JP | 2003231778 A | 8/2003 | |
| JP | 2007106918 A | 4/2007 | |
| JP | 2008045013 A | 2/2008 | |
| JP | 2009040966 A | 2/2009 | |
| JP | 2011132123 A | 7/2011 | |
| TW | I224117 | 11/2004 | |
| TW | 200604008 | 2/2006 | |
| TW | I318999 | 1/2010 | |

OTHER PUBLICATIONS

Intellectual Property Office, Ministry of Economic Affairs, R.O.C., "Office Action", Oct. 7, 2014, Taiwan.
Ha et al., Study on the Thermal Stability of Ordered Mesoporous SiO2 Film for Thermal Insulating Film, Microporous and Mesoporous Materials, accepted Manuscript, 2012.
Benamor et al., Flash induction calcination: A powerful tool for total template removal and fine tuning of the hydrophobic/hydrophilic balance in SBA-15 type silica mesoporous materials, Microporous and Mesoporous Materials, 2012, pp. 334-342, vol. 147.
Chen et al., Preparation of superhydrophilic mesoporous SiO2 thin films, Applied Surface Science, 2012, pp. 4334-4338, vol. 258.
Huang et al., Systematically comparative studies on the preparation and physical properties of PMMA—silica mesocomposite and nanocomposite membranes, Microporous and Mesoporous Materials, 2010, pp. 192-203, vol. 131.
State Intellectual Property Office of the P. R. C, "Office Action", dated Sep. 22, 2015, China.

* cited by examiner

COATING, METHOD FOR MANUFACTURING THE COATING AND FILM FORMED BY THE COATING

CROSS-REFERENCE TO RELATED APPLICATION

This non-provisional application claims priority under 35 U.S.C. §119(a) on Patent Application No(s). 101144034 filed in Taiwan, R.O.C. on Nov. 23, 2012, the entire contents of which are hereby incorporated by reference.

TECHNICAL FIELD

The disclosure relates to a coating.

BACKGROUND

In recent years, in order to increase the yield of plants, the plants are usually placed in a greenhouse, and lamps are equipped in the greenhouse to control the illumination time of the plants. However, the heat insulation of the films commonly used for constructing the greenhouse is poor, resulting in an excessively high temperature in the greenhouse. Therefore, an additional air conditioning system is required to cool the greenhouse, resulting in increased production costs.

Generally speaking, in order to manufacture a film having a high heat insulation coefficient, a conventional method is to apply a layer of coating on a polyethylene (PE) film or on a polyethylene terephthalate (PET) film, so as to improve the overall heat insulation capability of the PE film or the PET film by means of the high heat insulation property of the coating.

In selection of a heat insulation material, it seems that a mesoporous silica material can be used to solve the problem that the heat insulation of the films commonly used is poor. Since the contact between the solid particles of the mesoporous silica material is less, and the size of the pores of the mesoporous silica material is less than the mean free path of intermolecular collisions, the heat conduction path in the mesoporous silica material is restricted, and thereby the thermal conductivity of the gas is reduced. However, since the film-forming ability of the mesoporous silica material is poor, how to apply the mesoporous silica material in a heat insulation film has become a problem to be solved by researchers.

In addition, the commonly used films have the problems that the transmissivity of the films is not good, and water drops are easily condensed, resulting in an insufficient quantity of illumination. Therefore, additional lamps are required, resulting in increased production costs.

SUMMARY

According to an embodiment, a coating is disclosed. The coating includes an organosiloxane polymer and a mesoporous silica material. A monomer of the organosiloxane polymer is presented by the following Formula 1,

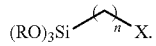

(Formula 1)

The mesoporous silica material and the organosiloxane polymer are bonded. In Formula 1, each R is an independently alkyl group, n presents a positive integer greater than or equal to 1, and X presents a siloxanyl group, a methyl methacrylate group, an epoxy group, a vinyl group, a fluoroalkyl group or a halogen. The surface of the mesoporous silica material includes a hydrophilic group.

According to an embodiment, a method for manufacturing a coating is disclosed. In the method, an organosiloxane polymer is provided, wherein the organosiloxane polymer is polymerized from a plurality of organosiloxanes, and each of the plurality of the organosiloxanes includes a terminal functional group. A mesoporous silica precursor is provided, wherein the mesoporous silica precursor includes a surface functional group. The organosiloxane polymer and the mesoporous silica precursor are blended in a solution, so that the surface functional group reacts with the terminal functional group to form a bond, as well as a mesoporous silica material is formed from the mesoporous silica precursor. The surface of the mesoporous silica material includes a hydrophilic group.

According to an embodiment, a film is disclosed. The film is formed by a coating disclosed in an embodiment. The film includes a thickness of 0.1 µm to 500 µm.

BRIEF DESCRIPTION OF THE DRAWINGS

The disclosure will become more fully understood from the detailed description given herein below for illustration only and thus does not limit the disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
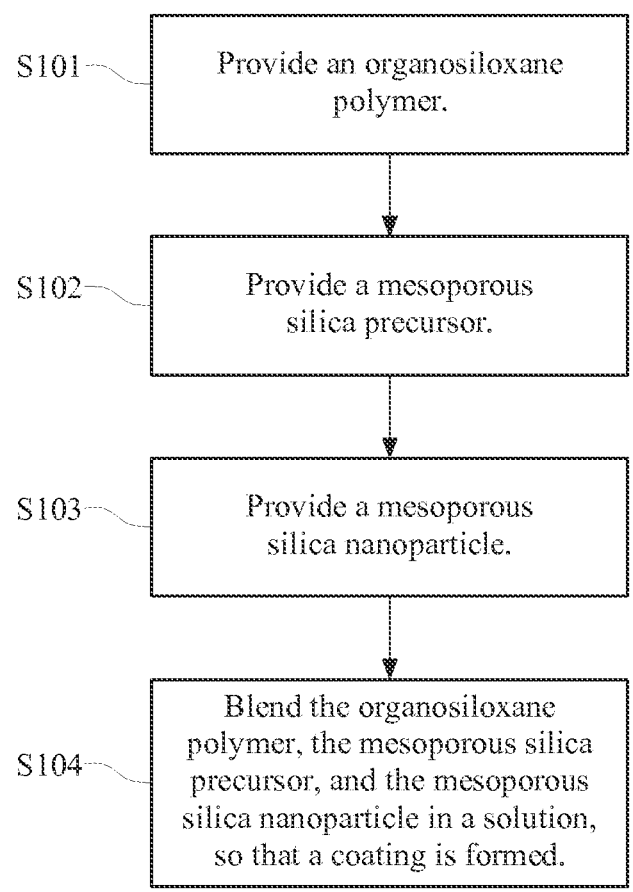
FIG. 1 is a flow chart of a method for manufacturing a coating according to an embodiment of the disclosure.

Please refer to FIG. 1. FIG. 1 is a flow chart of a method for manufacturing a coating according to an embodiment of the disclosure.

First, an organosiloxane polymer is provided (S101). The organosiloxane polymer is polymerized from a plurality of organosiloxanes. A monomer of the organosiloxane polymer is presented by the following Formula 1:

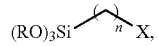

(Formula 1)

where each R is an independently alkyl group, n presents a positive integer greater than or equal to 1, X presents a terminal functional group of the plurality of the organosiloxanes, and the terminal functional group is a siloxanyl group, a methyl methacrylate group, an epoxy group, a vinyl group, a fluoroalkyl group or a halogen. Terminals of the plurality of the organosiloxanes are modified by terminal functional group, so that the plurality of the organosiloxanes is able to react with functional group, such as a hydroxyl group, to form a bond. In this embodiment, the organosiloxane polymer is a homopolymer comprising a monomer of Formula 1. In some other embodiments, the organosiloxane polymer is a copolymer comprising at least two different monomers of Formula 1.

The organosiloxane polymer is polymerized through a sol-gel process. A pH value of the reaction is 0 to 5, a reaction temperature is 10° C. to 40° C., and a reaction time is 0.5 to 5 hrs. In an embodiment, the pH value of the reaction is 1 to 3, the reaction temperature is 20° C. to 30° C., and the reaction time is 2 to 4 hrs.

During the reaction of forming the organosiloxane polymer polymerized from the organosiloxanes, Si—OR of the organosiloxanes are gradually hydrolyzed and transformed to Si—OH, as well as the organosiloxane polymer is formed through a dehydration reaction or a dealcoholization reaction between the hydroxyl groups of the organosiloxanes. Also, the organosiloxane polymer still remains a terminal functional group.

Next, a mesoporous silica precursor is provided (S102). The mesoporous silica precursor includes a surface functional group, for example, a hydroxyl group, but the disclosure is not limited thereto.

The mesoporous silica precursor is formed by polymerization from siloxanes through a solvent extraction process. A pH value of the reaction is −1 to 5, a reaction temperature is 10° C. to 80° C., and a reaction time is 0.5 to 3 hrs. In an embodiment, the pH value of the reaction is −1 to 1, the reaction temperature is 60° C. to 80° C., and the reaction time is 2 to 4 hrs.

During the reaction of manufacturing the mesoporous silica precursor from siloxanes, Si—OR of the siloxanes are gradually hydrolyzed and transformed to Si—OH, as well as the mesoporous silica precursor is formed through a dehydration reaction or a dealcoholization reaction between the hydroxyl groups of the siloxanes. The pH value, the temperature, and the time of the reaction are controlled, so that the mesoporous silica precursor still remains a surface functional group, for example, a hydroxyl group.

Compared with a mesoporous silica material manufactured through a calcination process, the mesoporous silica precursor manufactured through a solvent extraction process can still remain a surface function group because the reaction temperature required for the solvent extraction process is lower.

Then, a mesoporous silica nanoparticle is provided (S103). The mesoporous silica nanoparticle is manufactured by siloxanes with a surfactant as a template. The surface of the mesoporous silica nanoparticle includes a hydroxyl group.

The mesoporous silica precursor and the mesoporous silica nanoparticle can be uniformly mixed in the organosiloxane polymer. Moreover, since the film-forming ability of the organosiloxane polymer is good, a film can be easily manufactured by the mesoporous silica precursor and mesoporous silica nanoparticle.

However, the mesoporous silica nanoparticle does not limit to the disclosure. In some other embodiments, the organosiloxane polymer and the mesoporous silica precursor is reacted to manufacture a coating. In the descriptions below, embodiments involving an organosiloxane polymer, a mesoporous silica precursor, and a mesoporous silica nanoparticle are described as examples.

Afterwards, the organosiloxane polymer, the mesoporous silica precursor, and the mesoporous silica nanoparticle are blended in a solution, so that a coating is formed (S104).

The organosiloxane polymer, the mesoporous silica precursor, and the mesoporous silica nanoparticle are blended, so that the terminal functional group of the organosiloxane polymer reacts with the surface functional group of the mesoporous silica precursor and the hydroxyl group on the surface of the mesoporous silica nanoparticle to form a bond, as well as a mesoporous silica material is formed by the mesoporous silica precursor. Manufacture of the coating is completed. A reaction temperature is 80° C. to 200° C., and a reaction time is 1 to 5 hrs. In another embodiment, the reaction temperature is 130° C. to 150° C., and the reaction time is 2 to 4 hrs. The weight percentage of the organosiloxane polymer is 50 wt % to 80 wt %, and the weight percentage of the mesoporous silica material is 20 wt % to 50 wt %, as well as the weight percentage of the organosiloxane polymer and the weight percentage of the mesoporous silica material are based on the total weight of the organosiloxane polymer and the mesoporous silica material. If the weight percentage of the mesoporous silica material is excessively high, the film formed by the coating is rigid and the film is brittle. The weight percentage of the mesoporous silica nanoparticle is 10 wt % to 60 wt %, and the weight percentage of the mesoporous silica nanoparticle is based on the total weight of the mesoporous silica material. If the weight percentage of the mesoporous silica nanoparticle is excessively high, the film formed by the coating is rigid and the film is brittle. If the weight percentage of the blended mesoporous silica nanoparticle is excessively low, the heat-transferring capability of the film formed by the coating is lowered and the contact angle with water of the film formed by the coating is reduced, thereby the ability of anti-dropping of the film is lowered.

If the terminal functional group is an epoxy group, and the surface functional group is a hydroxyl group, then an ether bond is formed between the organosiloxane polymer and the mesoporous silica precursor, as well as another ether bond is formed between the organosiloxane polymer and the mesoporous silica nanoparticle. Thus, ether bonds are formed at the surface of the organosiloxane polymer. A particle diameter of the mesoporous silica material is 10 nm to 1000 nm, specific surface area of the mesoporous silica material is greater than 1000 square centimeter/gram ($cm^2/g$), and porosity of the mesoporous silica material is greater than 50%. The ether bonds are on the surfaces of the mesoporous silica material and the mesoporous silica nanoparticle, so the surface of the mesoporous silica material and the surface of the mesoporous silica nanoparticle both include a hydrophilic group, such as an ether group, an ester group, or a sulfonate group.

Finally, the coating is coated on a surface of a PE film, a PET film, and a near infrared (NIR) film, as well as the coating is dried and a transparent film is obtained. The drying method is, for example, baking, a baking temperature is 70° C. to 120° C., and a baking time is 15 min to 1 hr. In an embodiment, the baking temperature is 80° C. to 100° C., and the baking time is 20 min to 40 min.

The thickness of the manufactured film is 0.1 μm to 500 μm. The transmissivity of the film is greater than 80%. Contact angle of the film with water is lower than 40 degrees)(°). In another embodiment, the contact angle of the film with water is lower than 20°. In another embodiment, the contact angle of the film with water is lower than 10°.

In view of the above, according to the coating of the embodiments of the disclosure, since the terminal functional group of the organosiloxanes react with the surface functional group of the mesoporous silica precursor and the hydroxyl group of the mesoporous silica nanoparticle to form bonds, the organosiloxanes include the efficacy of an adhesive, thereby the film-forming ability of the mesoporous silica material is improved. Therefore, since the film formed by the coating includes the mesoporous silica materials, the insulation property of the film is good. In addition, since the thickness of the film formed by the coating according to the embodiments of the disclosure is 0.1 µm to 500 µm, the transmissivity of the film is also a good. In addition, since the contact angle with water of the film formed by the coating according to the embodiments of the disclosure is low, water vapor is not likely to condense on the film to form large water drops, and when water drops are condensed on the film, the water drops easily flow to the ground along the film due to the hydrophilicity of the surface of the film, thereby the degree of light obscuration caused by the water droplets is reduced.

The coating, the method for manufacturing the coating, and the film formed by the coating are described in detail below with reference to several embodiments, and the heat insulation property, the transmissivity, and the hydrophilicity of the film are tested by experiments.

Preparation of the Organosiloxane Polymer

First, 255.3 g of ethanol is added into a round-bottom flask. Next, 400 g of glycidoxypropyltrimethoxysilane is added into the round-bottom flask. The mixture is stirred uniformly, as well as 99.9 grams (g) of water and 20 mililiters (mL) of hydrochloric acid (0.01 molarity (M)) are added in sequence. The mixture is stirred at normal temperature for 3 hrs, and an unnecessary solvent is extracted out through vacuum distillation (24 mm-Hg), as well as organosiloxane polymer is obtained. The product is dried and weighed. The solid content of the product is 77.02% to 81%.

Preparation of the Mesoporous Silica Precursor

First, 124.992 g of tetraethyl orthosilicate (TEOS) is added into a round-bottom flask. Next, 276 g of ethanol is added into the round-bottom flask. The mixture is stirred uniformly, as well as 37.8 g of water and 3.48 g of hydrochloric acid (1 M) are added in sequence. The mixture is refluxed at 70° C. for 1 hr. In addition, 24.36 g of P123 $(HO(CH_2CH_2O)_{20}(CH_2CH(CH_3)O)_{70}(CH_2CH_2O)_{20}H)$ and 22.68 g of F127 $(HO(CH_2CH_2O)_{106}(CH_2CH(CH_3)O)_{70}(CH_2CH_2O)_{106}H)$ are added into another round-bottom flask, as well as 276 g of ethanol is added, so that the P123 and the F127 are dissolved in the ethanol. Finally, the two solutions are fully mixed, stood for aging at 30° C., and a mesoporous silica precursor is obtained.

Preparation of a Mesoporous Silica Nanoparticle 3.00 mL of polyoxyethylene-8-octylphenyl ether (Triton-X-100) and 3.0 g of cetrimonium bromide (CTAB) are added into a round-bottom flask, as well as 66 mL of concentrated hydrochloric acid is added, so that the Triton-X-100 and the CTAB are dissolved in the concentrated hydrochloric acid. Next, 6.6 mL of tetraethyl silane is added. The mixture is stirred for 30 min, stood for aging one day, washed with deionized water/ethanol several times, and a mesoporous silica nanoparticle is obtained.

Embodiment 1

7.5837 g of mesoporous silica nanoparticle (solid content of 8.8%), 7.1757 g of a mesoporous silica precursor, and 23.3415 g of organosiloxane polymer are reacted for 3 hrs at 140° C. The solution is applied on a surface of a PE film, a PET film, and an NIR film through coating, as well as baked for 30 min at a baking temperature of 90° C., and a transparent film is obtained.

Embodiment 2

19.78 g of mesoporous silica nanoparticle (solid content of 8.8%), 39.56 g of a mesoporous silica precursor, and 118.68 g of organosiloxane polymer are reacted for 3 hrs at 140° C. The solution is applied on a surface of a PE film, a PET film, and an NIR film through coating, as well as baked for 30 min at a baking temperature of 90° C., and a transparent film is obtained.

Embodiment 3

6.247 g of mesoporous silica nanoparticle (solid content of 8.8%), 18.741 g of a mesoporous silica precursor, and 43.729 g of organosiloxane polymer are reacted for 3 hrs at 140° C. The solution is applied on a surface of a PE film, a PET film, and an NIR film through coating, as well as baked for 30 min at a baking temperature of 90° C., and a transparent film is obtained.

After the coating manufactured in Embodiment 3 is coated on an NIR absorbing film, a heat insulation film including an NIR absorbing film and an inner heat insulation layer is obtained.

The heat insulation effect is tested through experiments in the following manner. The film is covered on a test box, then the test box is irradiated with artificial light, and a relationship between the temperature in the test box and the time is measured. The artificial light used is a halogen lamp, the power of the halogen lamp is 500 W, the applicable voltage of the halogen lamp is 110V, and the illuminance of the halogen lamp is 21,000±500 lux. The specification of the test box is as follows: front height 20 cm, rear height 30 cm, width 20 cm, and depth 20 cm. The temperature is detected at a position 5 cm below the film at the center of the test box. The objects of the test include NIR absorbing films coated with the coating of the disclosure and several commercially available heat insulation films. The comparison results are shown in FIG. 2, and FIG. 2 is a diagram of a relationship between the internal temperature of a test box and test time when the test box, covered by various films, is irradiated with artificial light.

Figure 2:
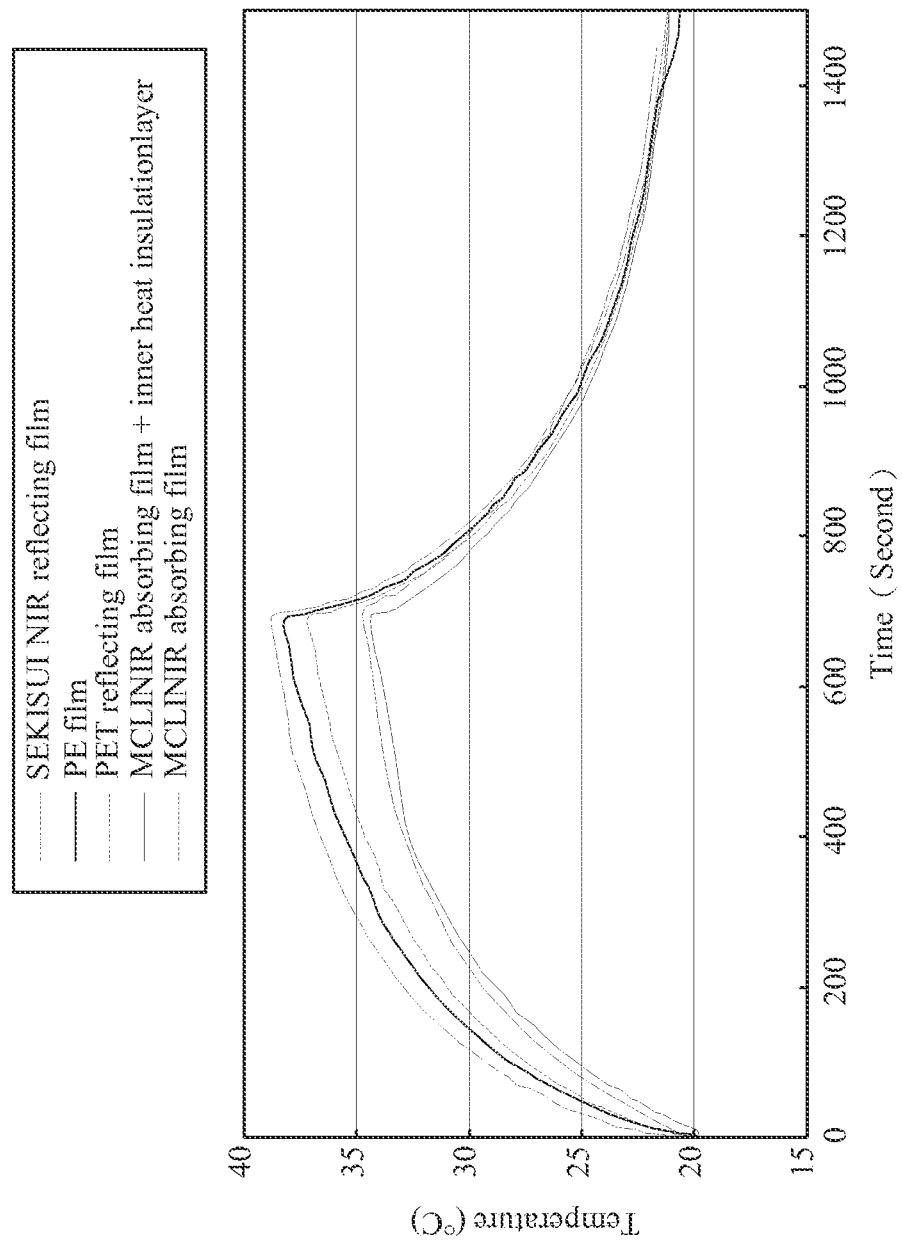
FIG. 2 is a diagram of a relationship between the internal temperature of a test box and test time when the text box, covered by various films, is irradiated with artificial light.

According to FIG. 2, after the light irradiation, the temperature in the test box covered by an NIR absorbing film, coated with the coating of the disclosure, is slightly raised, so the NIR absorbing film has a good heat insulation effect. The comparison result of the heat insulation effect is: NIR absorbing film+inner heat insulation layer>NIR absorbing film>SEKISUI NIR reflecting film>PE film>PET film.

Hereinafter, the emissivity of an NIR film coated with the coating of Embodiment 1 is compared with that of an NIR film without being coated with the coating of the disclosure.

Figure 3:
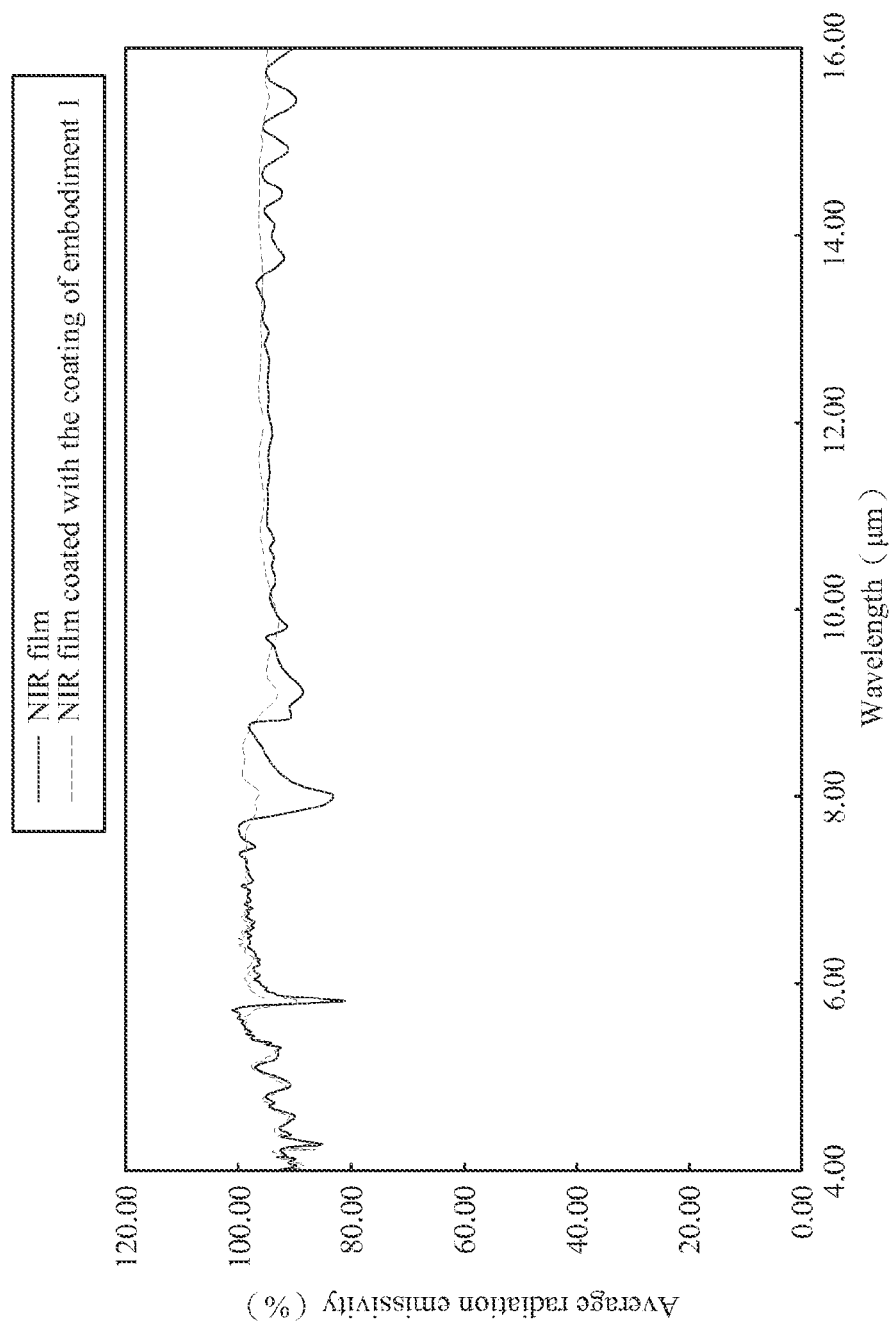
FIG. 3 is a diagram of a relationship between the emissivity and the wavelength when a near infrared (NIR) film is coated with a coating of Embodiment 1.

At a wavelength of 4 to 16 µm, the average emissivity of the NIR film, coated with the coating of Embodiment 1, is 96.26%, and the average emissivity of the NIR film without being coated with the coating of the disclosure is 94.41% (as shown in FIG. 3, FIG. 3 is a diagram of a relationship between the emissivity and the wavelength when an NIR film is coated with a coating of Embodiment 1). Thermal radiation of the film coated with the coating of the disclosure is good.

The comparison of the NIR film without being coated with the coating of the disclosure and the NIR film coated with the coating of Embodiment 1 is as shown in Table 1.

TABLE 1

Measurement of thermal conductivity coefficients

| Embodiment | Density ρ (g/cm³) | Cp (J/gk) | Thermal Diffusivity α (m²/s) | Thermal conductivity K W/mK |
|---|---|---|---|---|
| NIR film | 1.262 | 0.955 | 0.085 | 0.102 |
| NIR + coating of Embodiment 1 | 1.247 | 0.971 | 0.081 | 0.098 |

Figure 4:
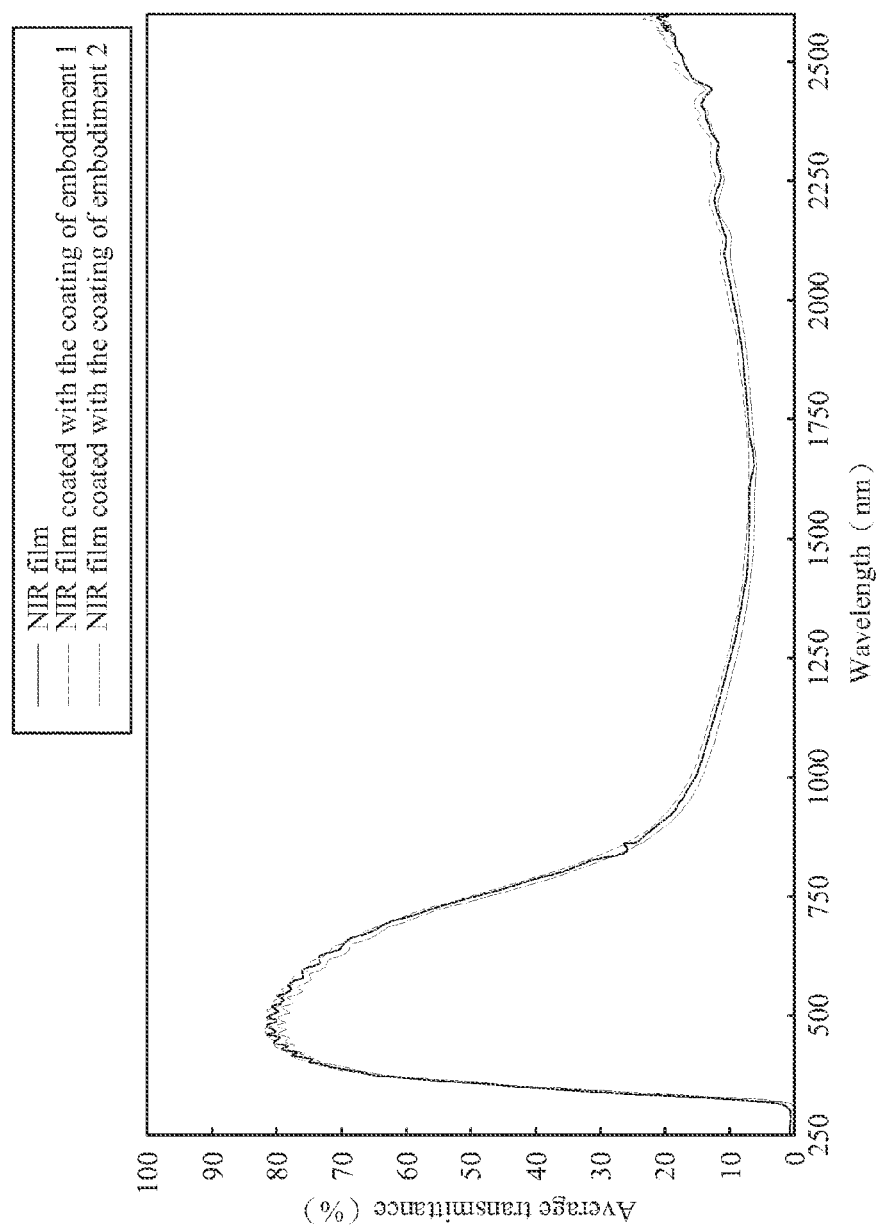
FIG. 4 is a diagram of a relationship between the transmissivity and the wavelength when coatings of Embodiments 1 and 2 are coated on NIR films.
Figure 5:
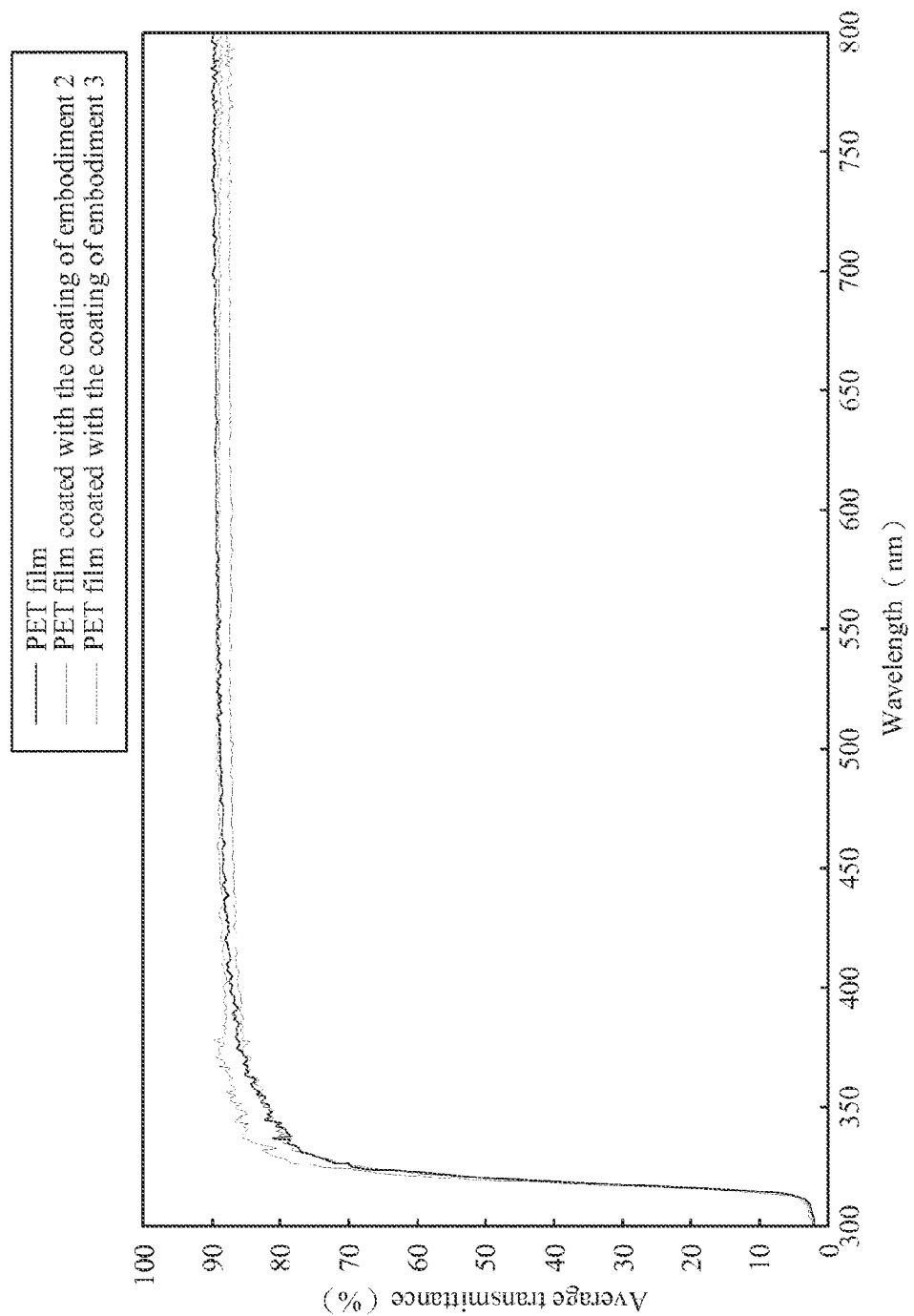
FIG. 5 is a diagram of a relationship between the transmissivity and the wavelength when coatings of Embodiments 2 and 3 are coated on PET films.

When the coatings of Embodiments 1, 2 and 3 are coated on a substrate, the transparency is improved, as well as the coatings are transparent and heat-insulating coatings (as shown in FIG. 4 and FIG. 5).

FIG. 4 is a diagram of a relationship between the transmissivity and the wavelength when the coatings of Embodiments 1 and 2 are coated on NIR films. Compared with an NIR film without being coated with the coating of the disclosure, the average transmissivity of the NIR films coated with the coatings of Embodiments 1 and 2 at a wavelength of 380 to 780 nm is increased from 68.96% to 71.27%.

FIG. 5 is a diagram of a relationship between the transmissivity and the wavelength when the coatings of Embodiments 2 and 3 are coated on PET films. Compared with a PET film without being coated with the coating of the disclosure, the average transmissivity of the PET films coated with the coatings of Embodiments 2 and 3 at a wavelength of 380 to 780 nm is increased from 87.3% to 89.1%. Since the mesoporous silica material has pores, the index of refraction of the film is reduced, thereby improving the transmissivity of the film.

The contact angles of the PE film coated with the coating of the disclosure and the PE film without being coated with the coating of the disclosure are shown in Table 2. Compared with the PE film without being coated with the coating of the disclosure, the contact angle of the PE film coated with the coating is lower, thus including good hydrophilicity. The higher the proportion of the mesoporous silica nanoparticle is, the lower the contact angle of the film is.

TABLE 2

Contact angle

| Embodiment | Contact Angle |
|---|---|
| PE film without coating | 105.6 |
| PE film coated with the coating of Embodiment 1 | 21.2 |
| PE film coated with the coating of Embodiment 2 | 11.8 |
| PE film coated with the coating of Embodiment 3 | 7.5 |

In summary, according to the coating of the disclosure, as the terminal functional group of the organosiloxanes can react with the surface functional group of the mesoporous silica precursor and the hydroxyl group of the mesoporous silica nanoparticle to form a bond, the organosiloxanes have the efficacy of an adhesive, thereby improving the film-forming ability of the mesoporous silica material. Therefore, since the film formed by the coating includes the mesoporous silica material, heat insulation effect of the film is good. Compared with several available commercial heat insulation films, after light irradiation, the temperature in the test box covered by an NIR absorbing film coated with the coating of the disclosure is slightly raised, so the NIR absorbing film has a good heat insulation effect. In addition, after an NIR film is coated with the coating of the disclosure, the average emissivity at a wavelength of 4 to 16 μm is increased from 94.41% to 96.26%, so the thermal radiation of the NIR film is good. In addition, after an NIR film is coated with the coating of the disclosure, the average transmissivity in the range of 380 to 780 nm is increased from 68.96% to 71.27%. After a PET film is coated with the coating of the disclosure, the average transmissivity at 380 to 780 nm is increased from 87.3% to 89.1%. Therefore, the film formed by the coating of the disclosure can actually increase the transmissivity of the NIR film and the PET film. In addition, the contact angle of the film formed by the coating of the disclosure with water is lower than 22°, so the film has a good hydrophilicity, so that water vapor is not likely to condense on the film to form large water drops, and when water drops are condensed on the film, the water drops easily flow to the ground along the film due to the hydrophilicity of the surface, thereby reducing the degree of light obscuration caused by the water droplets.

What is claimed is:

1. A coating material, comprising:
   an organosiloxane polymer, wherein a monomer of the organosiloxane polymer is presented by the following Formula 1:

(Formula 1)

a mesoporous silica material made from a mesoporous silica precursor, bonding with the organosiloxane polymer; and
   a mesoporous silica nanoparticle, bonding with the organosiloxane polymer, the weight percentage of the mesoporous silica nanoparticle is 10 wt % to 60 wt % and the weight percentage of the mesoporous silica nanoparticle is based on the total weight of the mesoporous silica material;
   wherein each R is an independently alkyl group, n presents a positive integer greater than or equal to 1, X represents a siloxanyl group, a methyl methacrylate group, an epoxy group, a vinyl group, a fluoroalkyl group or a halogen, and the surface of the mesoporous silica material includes a hydrophilic group.

2. The coating material according to claim 1, wherein the organosiloxane polymer is a homopolymer comprising a monomer of Formula 1.

3. The coating material according to claim 1, wherein the organosiloxane polymer is a copolymer comprising at least two different monomers of Formula 1.

4. The coating material according to claim 1, wherein the weight percentage of the organosiloxane polymer is 50 wt % to 80 wt %, and the weight percentage of the mesoporous silica material is 20 wt % to 50 wt %, as well as the weight percentage of the organosiloxane polymer and the weight percentage of the mesoporous silica material are based on the total weight of the organosiloxane polymer and the mesoporous silica material.

5. The coating material according to claim 1, wherein a particle diameter of the mesoporous silica material is 10 nm to 1000 nm.

6. The coating material according to claim 1, wherein a specific surface area of the mesoporous silica material is greater than 1000 cm$^2$/g.

7. The coating material according to claim 1, wherein a porosity of the mesoporous silica material is greater than 50%.

8. The coating material according to claim 1, wherein the hydrophilic group is an ether group, an ester group, or a sulfonate group.

9. A film, formed by the coating material according to claim 1, and including a thickness of 0.1 μm to 500 μm.

10. The film according to claim 9, wherein a light transmissivity of the film with a light having a wavelength from 380 nm to 780 nm is greater than 80%.

11. The film according to claim 9, wherein a contact angle of the film with water is less than 40°.

12. The film according to claim 9, wherein a contact angle of the film with water is less than 20°.

13. The film according to claim 9, wherein a contact angle of the film with water is less than 10°.

14. A method for manufacturing the coating material according to claim 1, comprising:
   polymerizing a plurality of organosiloxanes to form the organosiloxane polymer, wherein each of the plurality of the organosiloxanes includes a terminal functional group;
   providing the mesoporous silica precursor;
   providing the mesoporous silica nanoparticle; and
   blending the organosiloxane polymer, the mesoporous silica precursor and the mesoporous silica nanoparticle in a solution, so that the mesoporous silica precursor forms the mesoporous silica material, the surface functional group of the mesoporous silica precursor reacts with the terminal functional group to bond the mesoporous silica material and the mesoporous silica nanoparticle respectively to the organosiloxane polymer, wherein the weight percentage of the mesoporous silica nanoparticle is 10 wt % to 60 wt % and the weight percentage of the mesoporous silica nanoparticle is based on the total weight of the mesoporous silica material.

15. The method for manufacturing the coating according to claim 14, wherein the terminal functional group is a siloxanyl group, a methyl methacrylate group, an epoxy group, a vinyl group, a fluoroalkyl group, or a halogen.

16. The method for manufacturing the coating according to claim 14, wherein the organosiloxane polymer is a homopolymer of the organosiloxanes.

17. The method for manufacturing the coating according to claim 14, wherein the organosiloxane polymer is a copolymer of at least two different organosiloxanes.

18. The method for manufacturing the coating according to claim 14, wherein the surface functional group is a hydroxyl group.

19. The method for manufacturing the coating according to claim 14, wherein the organosiloxane polymer is manufactured by a sol-gel process.

20. The method for manufacturing the coating according to claim 19, wherein a pH value of the reaction for manufacturing the organosiloxane polymer is 0 to 5.

21. The method for manufacturing the coating according to claim 19, wherein a reaction temperature for manufacturing the organosiloxane polymer is 10° C. to 40° C.

22. The method for manufacturing the coating according to claim 19, wherein a reaction time for manufacturing the organosiloxane polymer is 0.5 to 5 hrs.

23. The method for manufacturing the coating according to claim 14, wherein the mesoporous silica precursor is prepared by a solvent extraction process.

24. The method for manufacturing the coating according to claim 23, wherein a pH value of the reaction for manufacturing the mesoporous silica precursor is −1 to 5.

25. The method for manufacturing the coating according to claim 23, wherein a reaction temperature for manufacturing the mesoporous silica precursor is 10° C. to 80° C.

26. The method for manufacturing the coating according to claim 23, wherein a reaction time for manufacturing the mesoporous silica precursor is 0.5 to 3 hrs.

27. The method for manufacturing the coating according to claim 14, wherein a reaction temperature is 100° C. to 200° C.

28. The method for manufacturing the coating according to claim 14, wherein a reaction time is 1 to 5 hrs.

* * * * *